UNITED STATES PATENT OFFICE.

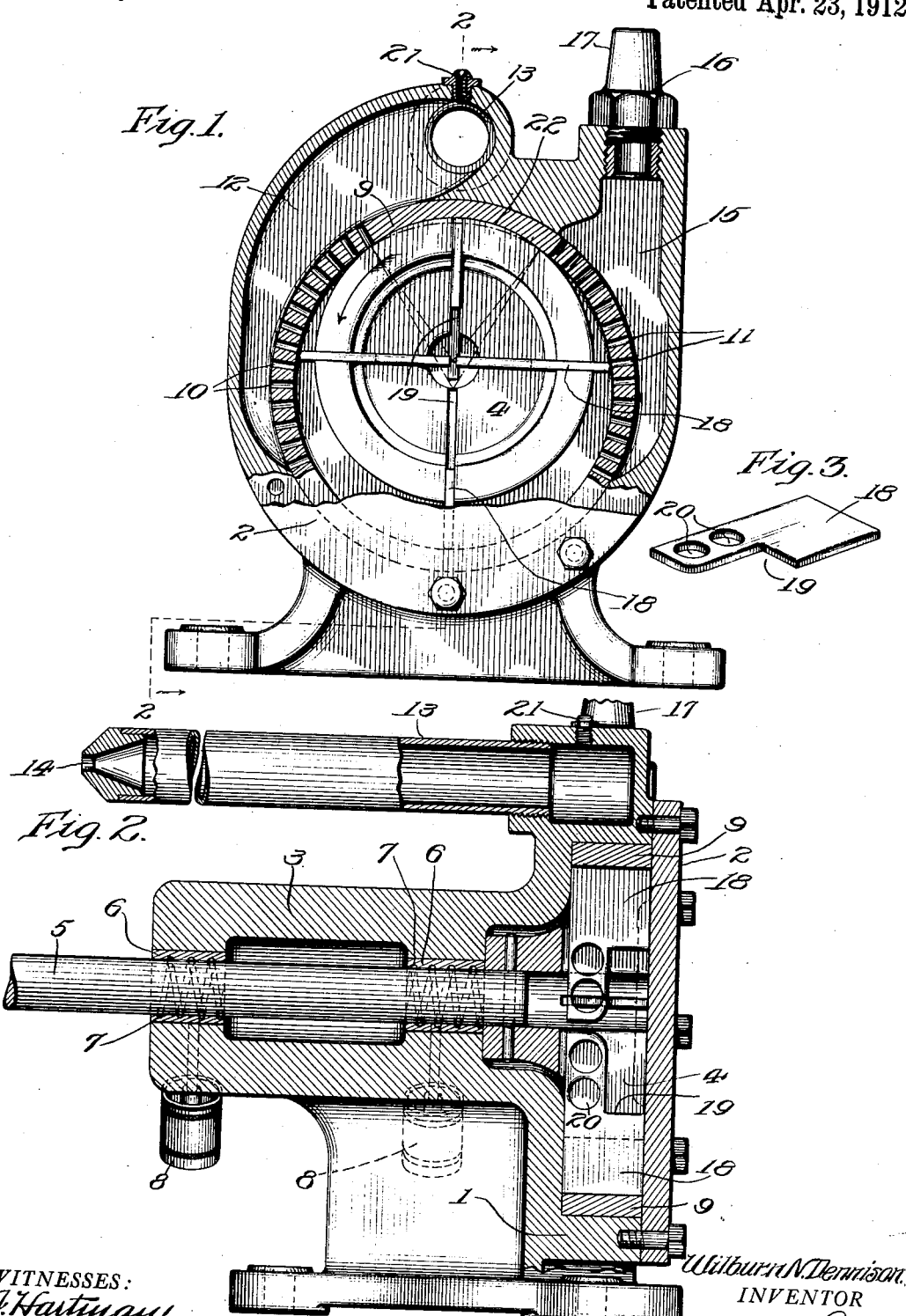

WILBURN N. DENNISON, OF MERCHANTVILLE, NEW JERSEY, ASSIGNOR TO VICTOR TALKING MACHINE COMPANY, A CORPORATION OF NEW JERSEY.

AIR-COMPRESSOR.

1,023,820.

Specification of Letters Patent.

Patented Apr. 23, 1912.

Application filed February 12, 1907. Serial No. 357,094.

*To all whom it may concern:*

Be it known that I, WILBURN N. DENNISON, a citizen of the United States, and a resident of the borough of Merchantville, State of New Jersey, have invented certain new and useful Improvements in Air-Compressors, of which the following is a full, clear, and complete disclosure.

My invention relates to improvements in rotary air compressors and more particularly to that class wherein radial sliding piston-blades are carried by a rotating piston-wheel set eccentrically within a cylinder.

The main object of my invention is to produce a machine which will be practically noiseless in its operation, and which will give a steady flow of air from its outlet.

Another object is to increase the efficiency and reduce the noise of a machine of this type by providing an improved means for preventing leakage between the intake and compression sides of the cylinder.

Further objects of my invention are to simplify the construction of the machine, reduce the friction between its moving parts, and to make its wearing parts removable.

Other objects of my invention will be apparent as the device is further explained.

My invention consists in the novel construction, combination and arrangement of parts hereinafter described, and more particularly set forth in the claims and illustrated in the accompanying drawings, in which—

Figure 1 is an end elevation with a part broken away; Fig. 2 a longitudinal vertical section of the device; and Fig. 3 a detail in perspective, showing one of the piston-blades.

Referring to the drawings, the device comprises a cylinder 1, provided at one end with a removable cylinder head 2, secured by bolts in the usual manner, and at its opposite end with a longitudinal eccentrically arranged reduced hollow extension 3, integral therewith. Within the cylinder is eccentrically arranged the piston-wheel 4, rigidly mounted upon the end of the shaft 5, which is journaled in the bearings 6—6, carried by the said extension 3 of the cylinder. The said piston wheel 4 is cylindrical in shape, and is provided with an inwardly extending hub of less diameter than the outer diameter of the wheel and the said extension 3 of the cylinder is divided by the bearings into two chambers, one of which is between the bearings, and the other of which is between the inner bearing and the main portion of the cylinder, and commu-
nicates therewith, forming a recess concentric with the bearings for the reception of the said hub of the piston wheel. The hub of the wheel is provided with a central bore and the end of the shaft 5 is rigidly secured in said bore by means of a pin or other suitable connection. The said bearings 6 are provided with spiral oil grooves 7, which are fed from the oilcups 8, located beneath the bearings. The cylinder is provided with a bushing 9, preferably made of phosphor bronze or similar anti-friction material. This bushing 9 is perforated for a part of its circumference upon one side with a series of apertures 10, forming inlet ports, and a corresponding series of apertures 11, upon the opposite side of the bushing forming outlet ports.

Adjacent to the inlet ports, the cylinder is provided with an inlet chamber 12, opening into the upper end of which is an elongated inlet duct 13, which is preferably formed of a separate piece of piping screw threaded into the upper part of the cylinder. The said inlet duct is provided with a reduced outer end, having an inlet orifice 14, less in area than the transverse sectional area of the duct, and having a diameter about one fourth the diameter of the duct, the purpose of which will be explained hereinafter. Opposite the said outlet ports 11 is a vertically extending outlet chamber 15, opening into a vertical thimble 16, screw threaded into the upper part of the cylinder, the said thimble being provided with a converging end 17, forming a socket for the attachment of a connection through which air is conveyed to any desired point.

The piston-wheel 4 is provided with radial slots within which are slidably mounted the piston-blades 18. These have a width equal to the distance between the opposite ends of the cylinder, and a length slightly in excess of the length of the radius of the said piston-wheel and the inner ends of the blades are notched as at 19 to a depth slightly exceeding half the width of the blade, and are arranged in said wheel so that the notched ends of the blades overlap during the operation of the compressor. The outer ends of the blades are slightly rounded to avoid cutting the interior surface of the bushing, and the inner ends of the blades are perforated at 20 to lighten the same, thus reducing the friction thereof against the bushing. An oil hole 21 is provided in the upper side of the inlet chamber, for lubricating the blades and the inner surface of the bushing, the oil being carried by gravity and by the current of air through the inlet chamber and inlet ports into the cylinder. The said cylinder bushing 9 is provided with an internal eccentric recess 22, the center of curvature of which is the axis of the piston-wheel, and its radius of curvature the radius of the piston-wheel, so that a bearing for said wheel is formed in said recess. Experience has shown that this feature of the compressor is important in preventing leakage past the upper side of the piston-wheel, between the intake and compression sides of the cylinder, and also in reducing the noise which always occurs whenever there is a leak between the high and low pressure sides.

In the operation of this device the piston-wheel is driven at a comparatively high speed, creating through the action of the piston-blades, the outer edges of which are held in engagement with the inner surface of the cylinder by centrifugal force only, a partial vacuum in the inlet chamber and inlet duct, the inlet orifice being reduced as heretofore stated, and purposely too small to permit of the passage of sufficient air to maintain the normal air pressure within these spaces. It has been found that the reduction of the size of the inlet orifice lessens the noise of the operation of the compressor, and that a compressor constructed and operated as thus described is practically noiseless and delivers a steady flow of air from its outlet.

Having thus fully described my invention what I claim and desire to protect by Letters Patent, is—

1. An air compressor having inlet and outlet ports, an elongated inlet duct having an inlet orifice with a diameter approximately equal to one quarter that of a transverse section of the duct.

2. An air compressor having inlet and outlet ports, an inlet chamber and an inlet duct opening into said chamber, said inlet duct having a reduced inlet orifice adapted to retard the inflow of air into said chamber, whereby a partial vacuum is formed in said chamber and duct.

3. An air compressor having an inlet duct provided with a reduced outer end and an opening for air in said outer end substantially smaller in area than the cross sectional area of said duct.

4. An air compressor having an inlet duct provided with a reduced outer end and an opening for air in said outer end substantially smaller in area than the cross sectional area of said duct, the opening in the end being less than half the area of the duct.

5. An air compressor having an inlet duct, provided with an inlet orifice substantially smaller in area than the cross sectional area of said duct.

6. An air compressor comprising a casing having a restricted inlet and a relatively large outlet, and separate chambers respectively connected with said inlet and outlet, an annular bushing having foraminous regions local to said chambers, and a rotary eccentric piston mounted in said bushing and having reciprocatory blades centrifugally engaged with said bushing.

7. An air compressor having an inlet duct, and means to check the flow of air into said duct.

8. In an air compressor, the combination with a casing, of a cylindrical piston having a reduced cylindrical inner end provided with a central bore, a driving shaft for said piston fitting within said bore and secured to said reduced end, the main portion of said piston being provided with diametrical slots extending from the outer end of said piston to the said reduced portion thereof, and radial piston blades mounted in said slots.

9. An air compressor having inlet and outlet ports, and an elongated inlet duct having an inlet orifice of a cross section approximately one-sixteenth that of the cross section of the duct, the restricted inlet orifice being operative to greatly decrease the fluid pressure within said duct before entering the adjacent ports.

10. An air compressor having a multiplicity of inlet and a multiplicity of outlet ports, and an elongated inlet duct having a greatly restricted inlet orifice, the restricted inlet orifice being operative to greatly decrease the fluid pressure within said duct before entering the adjacent ports.

11. An air compressor having a multiplicity of inlet and a multiplicity of outlet ports, and an elongated inlet duct having an inlet orifice of less cross section than one half the cross section of said duct.

12. An air compressor having a compression chamber, an inlet duct, and means adjacent said duct operative to greatly decrease the flow of fluid into said duct before entering said chamber.

In witness whereof, I have hereunto set my hand this 30th day of January, A. D. 1907.

WILBURN N. DENNISON.

Witnesses:
ALSTON B. MOULTON,
ALEXANDER PARK.